(12) United States Patent
Iwamura

(10) Patent No.: US 7,739,513 B2
(45) Date of Patent: Jun. 15, 2010

(54) SECURE DEVICE AUTHENTICATION

(75) Inventor: Ryuichi Iwamura, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1186 days.

(21) Appl. No.: 11/332,899

(22) Filed: Jan. 17, 2006

(65) Prior Publication Data

US 2006/0190730 A1    Aug. 24, 2006

Related U.S. Application Data

(60) Provisional application No. 60/655,225, filed on Feb. 22, 2005.

(51) Int. Cl.
*H04L 9/10* (2006.01)
*G06F 21/00* (2006.01)
*H04L 13/04* (2006.01)

(52) U.S. Cl. .......................... 713/183; 726/5

(58) Field of Classification Search .............. 726/3, 726/10, 12, 21, 36; 713/168–171, 161, 183–184
See application file for complete search history.

(56) References Cited

U.S. PATENT DOCUMENTS

| | | |
|---|---|---|
| 6,415,205 B1 | 7/2002 | Myron et al. |
| 2004/0054897 A1 | 3/2004 | Dawson et al. |
| 2004/0064699 A1 | 4/2004 | Hooker et al. |
| 2004/0083368 A1 | 4/2004 | Gehrmann |
| 2004/0151390 A1 | 8/2004 | Iwamura |
| 2004/0177167 A1 | 9/2004 | Iwamura et al. |
| 2004/0184406 A1 | 9/2004 | Iwamura |
| 2004/0199769 A1* | 10/2004 | Proudler ............... 713/169 |
| 2004/0203357 A1 | 10/2004 | Nassimi |
| 2004/0208139 A1 | 10/2004 | Iwamura |
| 2004/0261101 A1 | 12/2004 | Iwamura |
| 2005/0008086 A1 | 1/2005 | Koga et al. |
| 2005/0015805 A1 | 1/2005 | Iwamura |
| 2005/0018766 A1 | 1/2005 | Iwamura |
| 2005/0047379 A1 | 3/2005 | Boyden et al. |
| 2005/0063355 A1 | 3/2005 | Iwamura |
| 2005/0108760 A1 | 5/2005 | Iwamura |
| 2005/0132234 A1 | 6/2005 | Dawson |
| 2005/0144449 A1* | 6/2005 | Voice .................. 713/169 |
| 2005/0177284 A1* | 8/2005 | Kugumiya et al. ......... 701/1 |
| 2005/0210295 A1 | 9/2005 | Iwamura |

* cited by examiner

*Primary Examiner*—Gilberto Barron, Jr.
*Assistant Examiner*—Venkat Perungavoor
(74) *Attorney, Agent, or Firm*—Miller Patent Services; Jerry A. Miller

(57) ABSTRACT

A method for authenticating a client device into a network consistent with certain embodiments involves at a server device, generating a multi-digit random secret number; displaying the random secret number on a server display coupled to the server device; positioning the client device in close enough physical proximity to the server device to permit observation of the displayed random secret number; at the client device, sequentially entering each digit of the random secret number by actuation of a switch coupled to the client device a number of times equivalent to each digit of the random secret number; and upon correct entry of the random secret number at the client device, completing an authentication and key exchange process using the random secret number in an encryption and decryption process carried out at the server device and the client device. This abstract is not to be considered limiting, since other embodiments may deviate from the features described in this abstract.

34 Claims, 5 Drawing Sheets

SECURE DEVICE AUTHENTICATION

CROSS REFERENCE TO RELATED DOCUMENTS

This application is related to and claims priority benefit of U.S. Provisional Application No. 60/655,225 filed Feb. 22, 2005, which is hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Home network market is getting larger and larger. Many wireless, powerline, coax cable network products are available in the market. One issue is encryption for content protection and security. For example, a powerline network is shared with neighbors. If a communication is not encrypted, the neighbor can see it. Encryption is indispensable for secure network communication.

For encryption, a new client device must be registered to the server. In a common case, a client has a unique ID and the user enters the ID number to the server when he/she begins to use the client device. The unique ID is, for example, a 10-digit value. It is not user-friendly to have the user enter a long number. With a wrong number, the server cannot communicate with the client at all. Also, it takes huge amount of time to register many client devices.

To resolve this problem, several methods have been devised. One of the simplest solutions is a push button approach as described in U.S. Publication number 2004/0054897 to Dawson et al. In this technique, the user simultaneously or sequentially pushes the button on the server and the one on the client. Then, the server and the client exchange necessary information. Entry of a number is not required. This is user-friendly, and provides a good measure of security. However, further security is even more desirable in certain circumstances.

One of the famous attacks is called Man-In-The-Middle (MITM) attack as described, for example in Cryptography Decrypted by H. X. Mel and Doris Baker, Addison-Wesley, ISBN: 0201616475. The client sends the server its own public key to receive secret information. The server encrypts the secret information with the client public key and sends it back to the client. The client decrypts the encrypted data with its own private key. No other guy can decrypt the encrypted data only with the client public key. This seems safe, but is vulnerable to MITM. The adversary is in the middle of the server and the client and gets the request from the client. The adversary replaces the client public key with his own public key and sends it to the server. The server encrypts the secret information with the adversary public key and sends back to the adversary. The adversary successfully decrypts the secret data with his own private key. Also, the adversary re-encrypts the secret data with the client public key and sends to the client. The client decrypts the secret data without knowing the data has been stolen. The public/private key encryption is rigid and hard to break. However, public key must be carefully delivered. The simple push button approach may be ineffective in certain embodiments against MITM and similar attacks.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
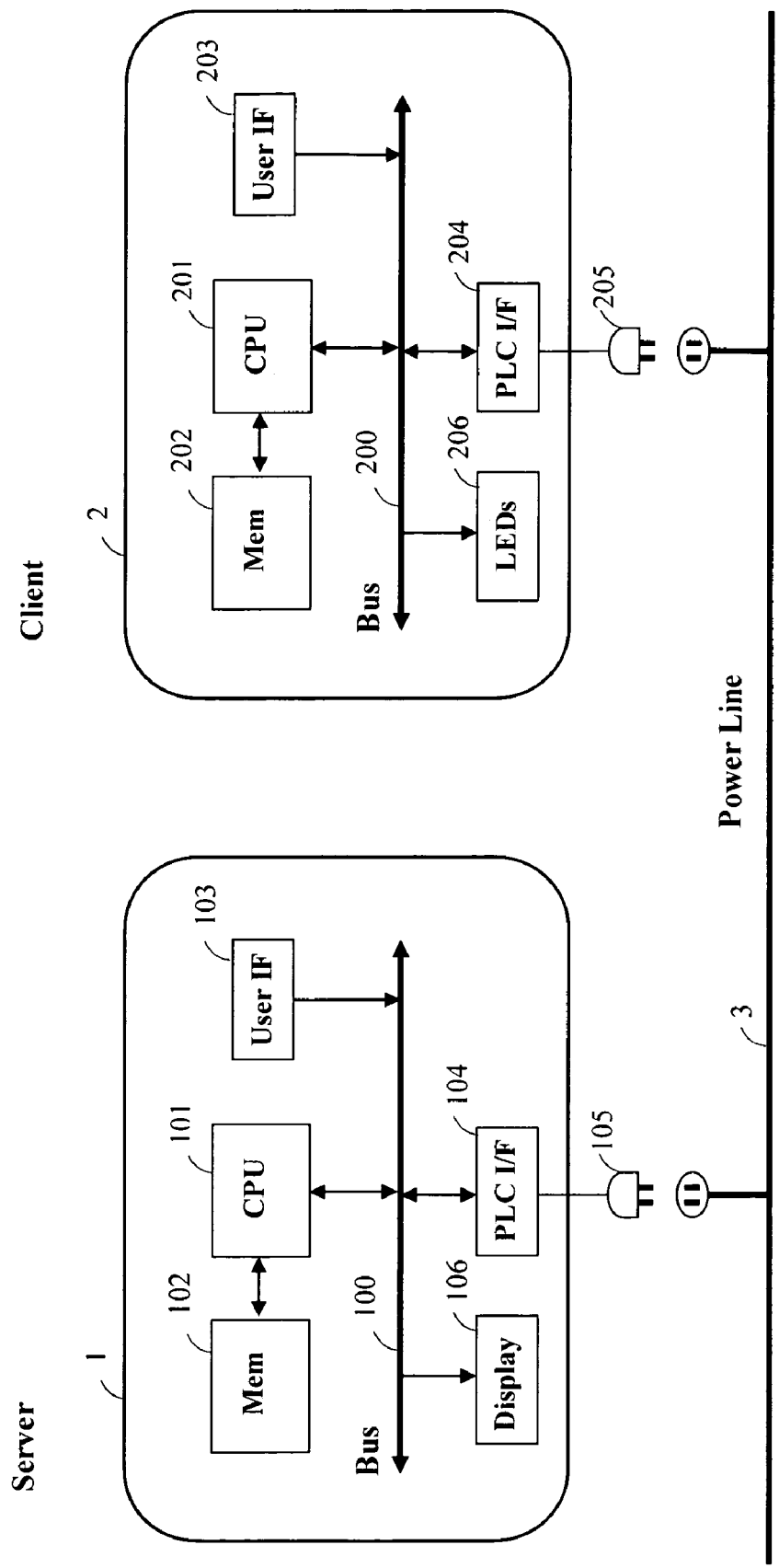
FIG. 1 is a block diagram of a network including a client and a server consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "hash" is used in accordance with the conventional meaning for such a term in the encryption arts. Generally, hash values are produced for accessing data or for security. A hash value (or simply hash), also called a message digest, is a number generated from a string of characters. Generally, the hash is smaller in size than the string, and is generated by a formula (a one way algorithm) in such a way that it is extremely unlikely or impossible that some other text will produce the same hash value. An ideal hash value is thus generated by applying a mathematical formula to the string to produce a value that is generally significantly shorter that the original text and is unique to the original document. The same value is achieved every time the algorithm is applied to the same string. Ideally, it should be computationally infeasible for the original string of text to be reconstituted from the hash result. Additionally, two different messages should not produce the same hash results.

The term "random" as used herein in reference to random number is intended to embrace random, semi-random and pseudorandom without limitation.

The term "flashing display" is used herein to mean any type of display device such as a lamp, a light emitting diode (LED) or liquid crystal display (LCD). The term is further to be interpreted as any type of display that can represent a number by a flashing mechanism, wherein the number of flashes can be counted, regardless of whether the display produces the flashing by emitting light, reflecting light, blocking light, polarizing light or any other mechanism that can be used to produce an alternating on and off representation.

In order to prevent a MITM attack, the server and the client consistent with certain embodiments of the present invention share a secret number (secret key) that no other entity knows. This provides a more secure device authentication method than existing push button approach. A number of presses or/and press timing is used to share the secret key. Using this mechanism, it is hard for an adversary to compromise the network.

In accordance with certain embodiments consistent with the present invention, the secret number is shared using the following mechanism. A server indicates a number to the user. The user presses a client button in accordance with the number indicated by the server. For example, the server may display a secret number such as 3-2-5-8. The user presses the client button three times and presses an enter button to indicate the end of the entry. The user then enters the second digit by pressing the client button twice followed by the enter button. Similarly, the third digit—in this example a five—is entered by pressing the client button five times followed by the enter button. Finally, the fourth digit—in this example an eight—is entered by pressing the client button eight times followed by the enter button. Of course, a three digit number, a five digit number, etc. could also be used, with more digits providing greater security at the expense of somewhat more tedious authentication.

In accordance with certain other embodiments consistent with the present invention, the secret number is shared using the following mechanism. A server again indicates a number to the user. The user presses a client button in accordance with the number indicated by the server. For example, the server may sequentially display (or fully display) each digit of a number such as 3-2-5-8. When the first digit of the secret number is displayed (three) the user presses the client button three times. In one embodiment, the numbers are displayed by use of a simple flashing light, LED, etc. (while in other embodiments a single digit display can be used). Thus, the light flashes three times and, in response, the user presses the client button three times (e.g., within a certain time window). Then the next digit is displayed—in this example a two—by flashing a light two times. The user responds by pressing the client button twice. Similarly, the third digit—in this example a five—is displayed by flashing the light five times and the user responds by pressing the client button five times. Finally, the fourth digit—in this example an eight—is displayed by flashing the light eight times and the user responds by pressing the client button eight times. Of course, a three digit number, a five digit number, etc. could also be used, with more digits providing greater security at the expense of somewhat more tedious authentication.

Once the above process has been completed, the client public key can be encrypted using the ID (e.g., 3258). Since no raw data are ever transmitted over the network, the device is securely authenticated. Note that only a very rudimentary interface is required to implement this scenario, hence, the implementation cost can be minimized.

Turning now to the drawings, FIG. 1 illustrates a server 1 and a client 2 coupled to a powerline communications (PLC) network 3. To simplify the figure, the components that are not related to this invention are not shown. (Ex. audio/video encoder, decoder, etc.) CPU 101 controls all the components in the server 1 through the internal bus 100 under control of software and/or firmware. Memory 102 is any suitable electronic storage medium and stores the software/firmware program that runs on CPU 101. User Interface 103 is, for example, a set of buttons or keyboard. Display 106 is a LCD (Liquid Crystal Display) or a set of LEDs (Light Emitting Diodes) or any other suitable display technology as will be explained further later.

Input data from the user is sent to CPU 101 from User Interface 103. Data to display is sent from CPU 101 to Display 106. Network communication is performed through PLC Interface 104. Power Plug 105 is plugged to the powerline network 3.

In accordance with embodiments consistent with the present invention, Client 2 is a network device that is to register with Server 1. In order to carry out such registration, an authentication process is utilized. Component 201 to 205 work in a manner which is similar to components 101 to 105 in Server 1. Component 206 is a set of LEDs. Client 2 may be realized with a minimal user interface in certain embodiments. For example, Client 2 may be devoid of an elaborate interface, and may only include a simple set of one or more push buttons. By way of example, Client 2 may be, for example, a rear surround sound speaker or a subwoofer used in a home theater application.

In addition to control of the operation of the client and server devices 1 and 2 respectively, CPUs 101 and 201, operating under appropriate program control, may also serve as encryption/decryption engines (which either encrypts or decrypts data or both) in connection with certain embodiments. In other embodiments, dedicated hardware can be used to carry out encryption and decryption processes.

Figure 2:
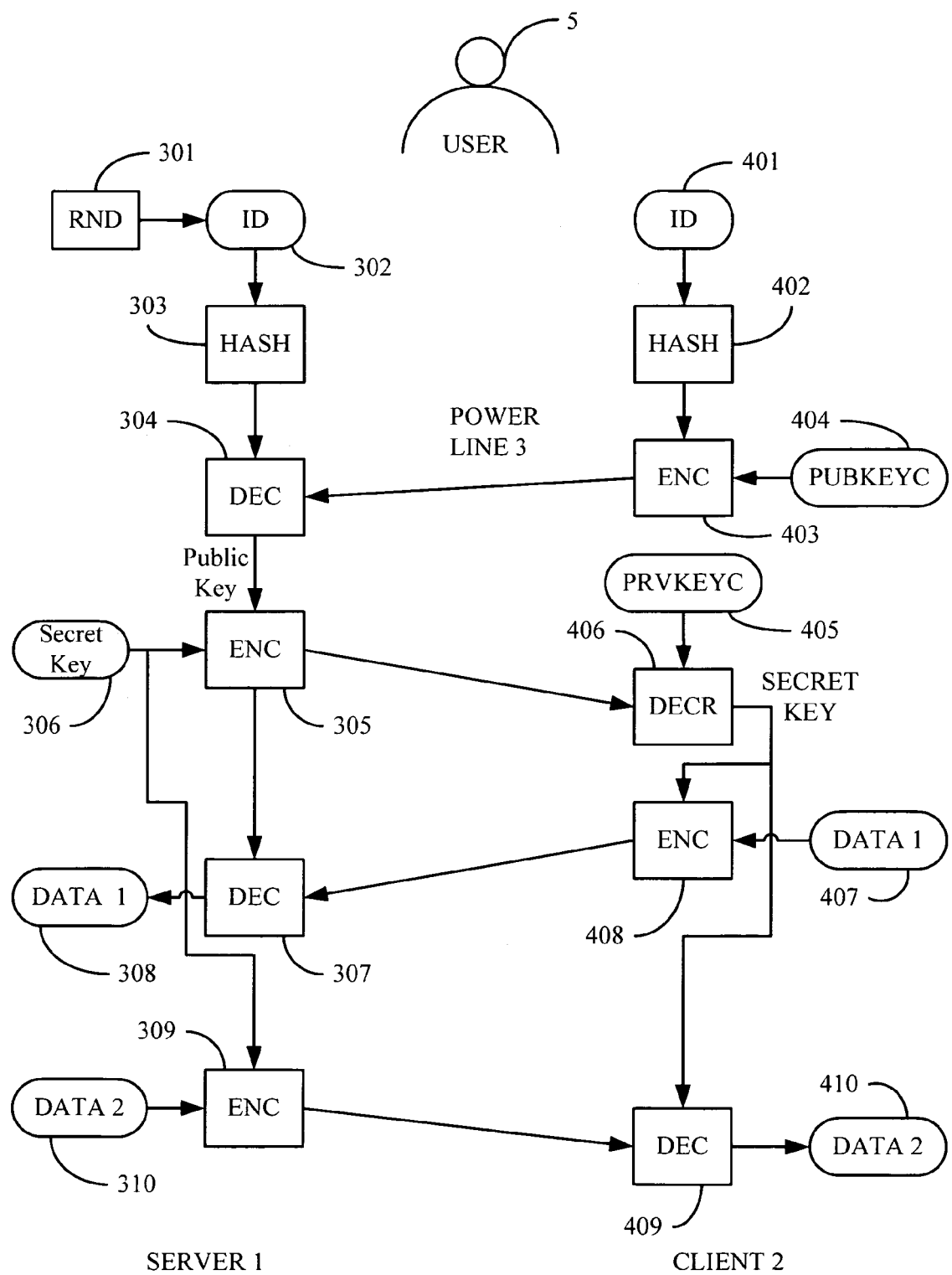
FIG. 2 is a flow chart depicting an exemplary authentication and key exchange process consistent with certain embodiments of the present invention.

FIG. 2 illustrates an exemplary device authentication process. The user sets the server 1 and client 2 in a device registration mode. In this figure, elements 301 through 310 are elements or functions carried out in server 1 and elements 401 through 410 are elements or functions carried out in client 2. Random number generator 301 (a hardware or software implemented function of the server 1, for example a program running on CPU 101) generates an ID number 302. (A unique ID is generated for each authentication.) The number is, for example, a 4-digit number (0000-9999). In one embodiment, this ID number is shown in Display 106 of the server once it is generated.

When carrying out the authentication process, the client device and the user device should be temporarily physically located in close proximity so that the user 5 is able to see the ID number in Display 106, as well as manipulate the user interface 203 of the Client device 2. Thus, the user 5 sees the ID number and enters this number into the Client 2 using the one or more buttons in User I/F 203. In one example embodiment, the display 106 displays the ID number, while in other embodiments, the display may be a simple light or LED which flashes a number of times to represent each digit.

For purposes of this example, assume the ID is "3915". In one embodiment, the display shows the ID number 3915 in the display 106 which the user is able to read. The user then pushes an input button in User I/F 203 three times and pushes the return button once. Similarly, the remaining 3 digits are entered, with each digit's entry being followed by pressing an enter button. Once each of the digits is entered into the client device via user interface 203, the same ID is set to each of the server and the client (302 and 401).

ID 401 is hashed at 402 (for example, using the CPU 201 operating under program control, for example). For example, MD5 is used for hashing (Hashing is a known technique described in greater detail, for example in Applied Cryptography by Bruce Schneier, Wiley, ISBN: 0471117099, which is hereby incorporated by reference). The public key of the client 2 (404) is encrypted in the encryptor 403 (an encryption/decryption engine). The encryption method is a symmetric encryption, for example, 128-bit AES encryption. The hashed result is used as an encryption key. The encrypted public key (PubKeyC 404) is sent to the server 1 over the powerline network 3 (or any other suitable network). ID 302 is hashed at 303 (for example using programmed CPU 101) in the same way. Decryptor 304 decrypts the encrypted key from the client 2 with the same hashed result. The original PubKeyC 404 is obtained by Server 1. Encryption and decryption can be carried out using CPUs 101 and 201 or using dedicated hardware.

Note that no original public key is sent over the network without encryption. Therefore, an adversary cannot get the public key 404 by monitoring network traffic. If the adversary replaces the encrypted client public key with his/her own public key, a decrypted result in the server 1 will not produce a valid result. Thus, no MITM attack is available. Also, the server 1 performs decryption 304 only once in the device authentication mode in order to prevent a brute force attack. It is not practical for the adversary to try all 10,000 ID combinations (for a four digit secret random number). In accordance with certain embodiments consistent with the present invention, a brute force attack can be avoided by configuring the server 1 to allow each client to try only a certain times (for example 5 times), after which the client is locked out until other procedures are carried out to reset the client's ability to try again (e.g., resetting the ID and restarting the authentication process). The ID is used only once for public key delivery.

After PubKeyC 404 is shared by both devices, the server 1 sends another secret key 306 to the client 2. The secret key may be a common access key that is shared with all the devices in the logical network. The secret key 306 is encrypted with PubKeyC 404 in the encryptor 305. The encryptor performs public-private key encryption, for example, using the Diffie-Hellman method as described in Applied Cryptography by Bruce Schneier, Wiley, ISBN: 0471117099. The encrypted result is transmitted to the client 2. The client 2 decrypts it with the client private key 405 and obtains the secret key. Public-private key encryption/decryption takes substantial calculation time compared with AES encryption. While AES is preferred in this embodiment, it should not be considered limiting. However, it is performed only once for each device authentication. Once the secret key 306 is shared by both devices, subsequent communications can be encrypted using the secret key 306. Data1 407 is AES-encrypted (in this embodiment) with the secret key 307 and sent to the server 2. The server 2 decrypts the encrypted Data1 with the same secret key 306 and obtains Data1 (308). Similarly, when the server 1 sends Data2 310, it is AES-encrypted with the secret key 306. The client 2 decrypts the encrypted Data2 with the secret key 306 and obtains Data2 410. Note that the public key and the secret key are, for example, 128-bit long, which is enough to prevent any brute force attack at present. Longer keys can of course be used as required to further inhibit brute force attacks.

In certain embodiments, after the secret key is shared, the client 2 may according to certain embodiments send the server its device information, for example, device name, type, manufacturer, serial number, etc. The server 1 can then show the device information on the display 106. The user can then see it and determine that the information is correct. If correct, the user pushes a button for verification. In the event an adversary tries to register his/her illegal or unauthorized device, the user can use this opportunity refuse it.

The server 1 may broadcast a notice on the new device to all the other client devices on the network. If they have a display, all the users can know what device is connected. This prevents a rogue device from being secretly connected to the network.

Thus, a method for authenticating a client device into a network consistent with certain embodiments involves at a server device, generating a multi-digit random secret number; displaying the random secret number on a server display coupled to the server device; positioning the client device in close enough physical proximity to the server device to permit observation of the displayed random secret number; at the client device, sequentially entering each digit of the random secret number by actuation of a switch coupled to the client device a number of times equivalent to each digit of the random secret number; and upon correct entry of the random secret number at the client device, completing an authentication and key exchange process using the random secret number in an encryption and decryption process carried out at the server device and the client device.

Another method for authenticating a client device into a network consistent with certain embodiments involves at a server device, generating a multi-digit random secret number; displaying the random secret number on a server display coupled to the server device; positioning the client device in close enough physical proximity to the server device to permit observation of the displayed random secret number; at the client device, sequentially entering each digit of the random secret number by actuation of a switch coupled to the client device a number of times equivalent to each digit of the random secret number; hashing the random secret number at the server device using a hashing algorithm to produce a secret key; hashing the random secret number at the client device using the hashing algorithm to produce the secret key; and using the secret key to encrypt and decrypt an encryption/decryption key that is exchanged between the client device and the server device.

The display can be a multi-digit display wherein the random secret number is displayed in its entirety by the display.

The random secret number can be displayed by the display a single digit at a time. The display can be a flashing display that represents each digit of the random secret number by a number of flashes. An enter switch can be actuated after entry of each digit in order to signify the end of entry of the digit.

Figure 3:
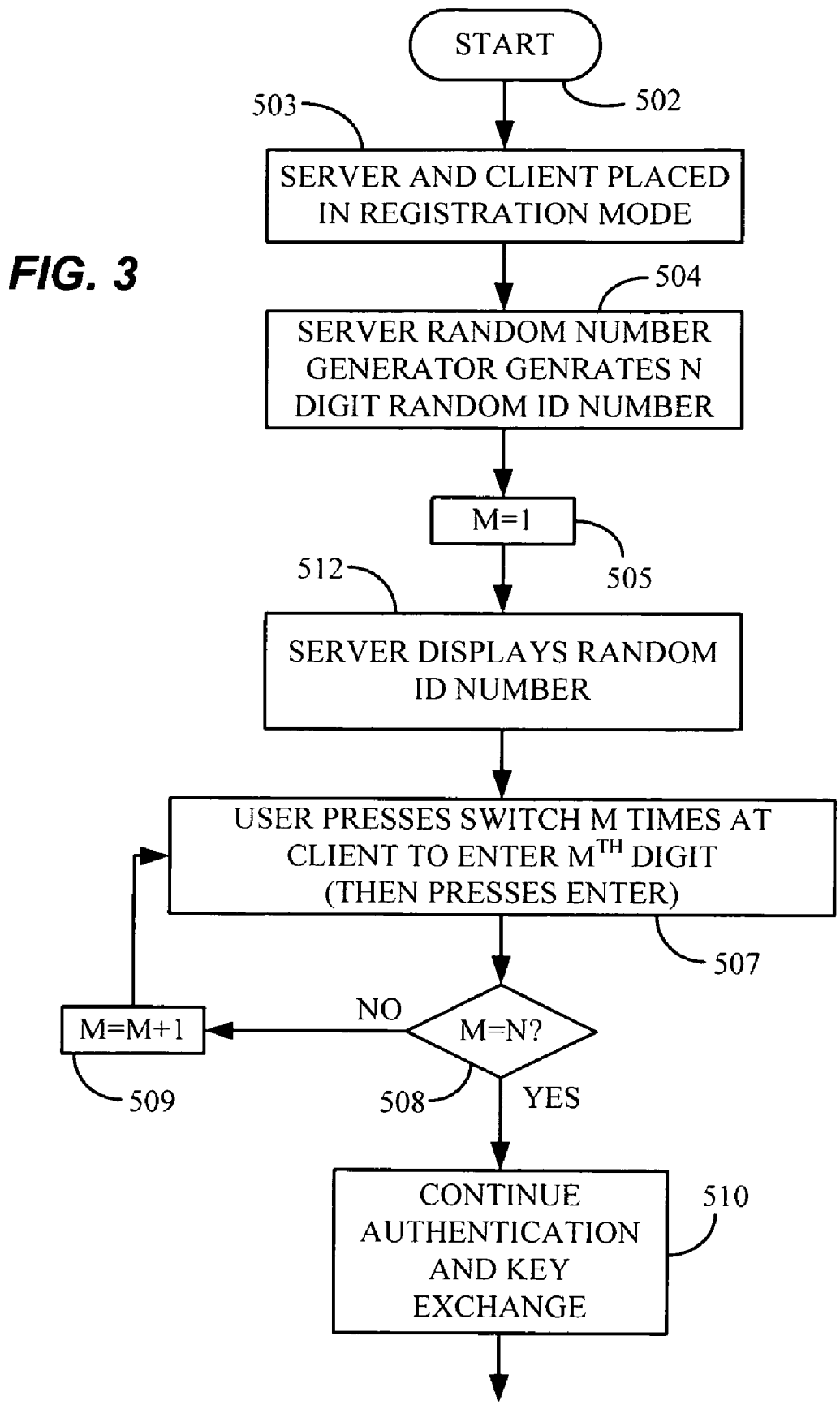
FIG. 3 is a flow chart depicting a portion of an exemplary embodiment of an authentication process consistent with certain embodiments of the present invention.
Figure 4:
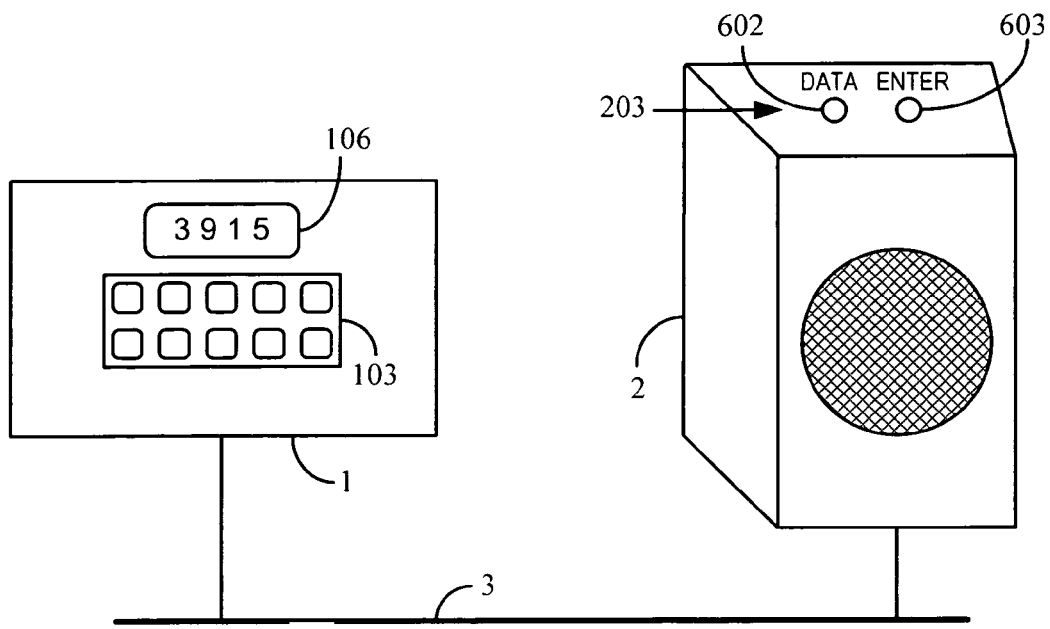
FIG. 4 is a block diagram of an example client server system consistent with certain embodiments of the present invention.

The first portion of the above process is depicted in greater detail in FIG. 3 taken in conjunction with FIG. 4 starting at 502. As previously described, the server 1 and client 2 are placed in a registration mode (using a predetermined operational sequence) at 503. The server 1 then generates a random ID number at 504. In general, this number can be N digits long, with N=4 being a suggested number of digits. A counter (M) is initialized to 1 at 505 and the server 1 displays the random ID number on display 106 at 512 (e.g., 3915 as shown). At 507, the user begins entry of the ID number using the data button 602 by pressing the data button the number of times specified by the first digit of the ID number. When the first digit is entered, the enter button 603 is pressed once. Control then passes to 508 where if the last digit has not yet been entered, the counter is incremented and control returns to 507 where the next digit is entered in the same manner. Once all digits have been entered at 508, the remainder of the authentication and key exchange process as previously described is carried out at 510 (i.e., the process that starts at 401).

Numerous variations will become evident to those skilled in the art upon consideration of the present teachings. For example, the following variation can be used to enter an ID to the client 2 in an environment wherein server 1 has no display capability. In this embodiment, Server 1 can utilize a simple LED or other light in place of the display. The user pushes the client button while the LED is on. When "9" should be input following "3", the LED shortly blinks three times and then the LED blinks nine times after a long break. Blinking speed is so slow that the user can follow it.

Figure 6:
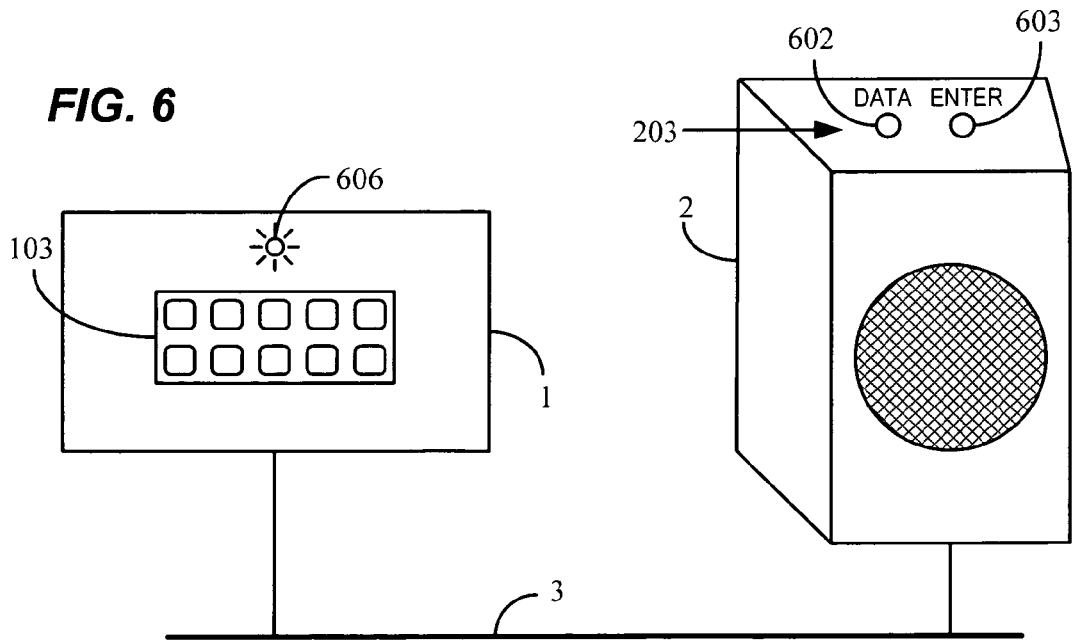
FIG. 6 is another block diagram of an example client server system consistent with certain embodiments of the present invention.
Figure 5:
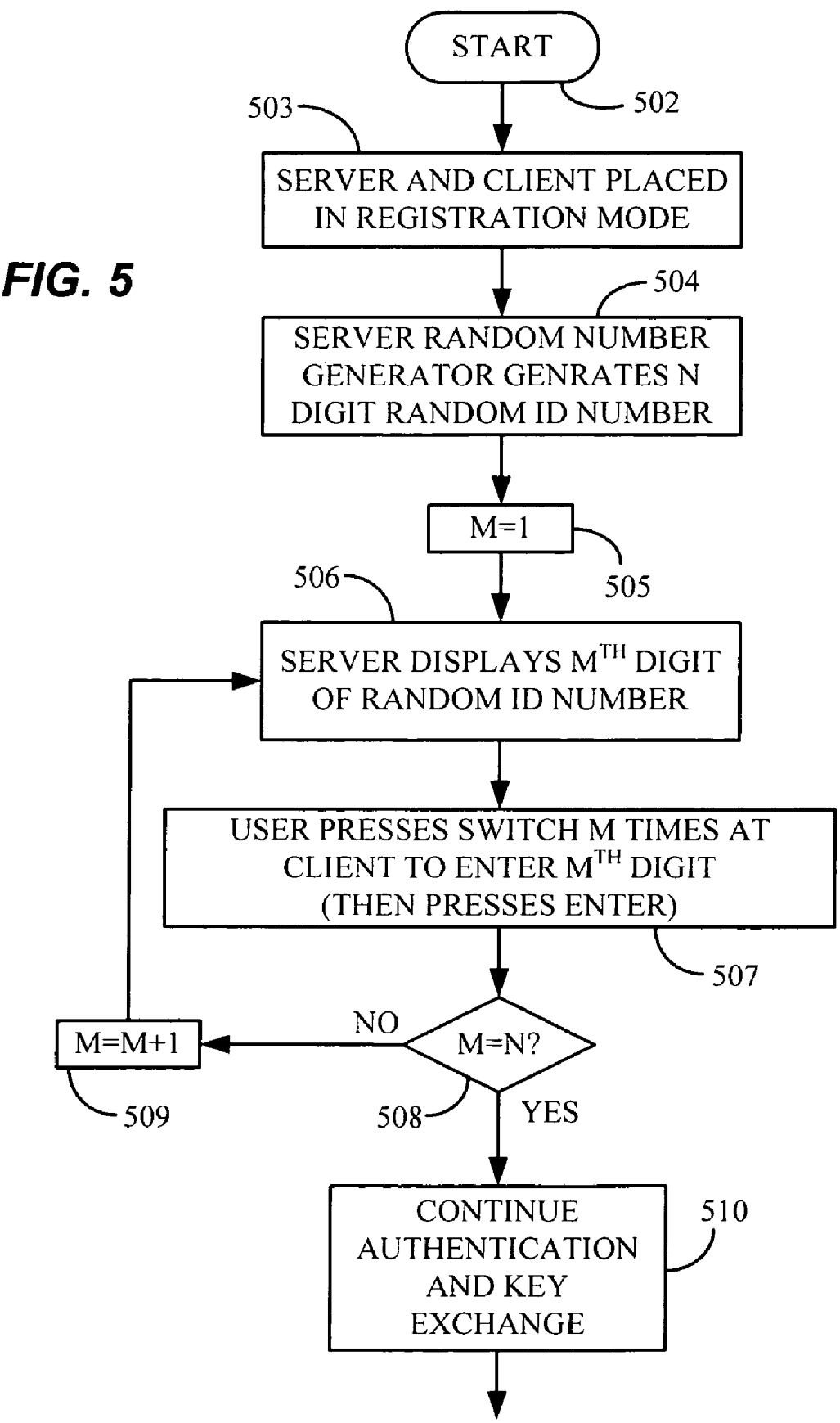
FIG. 5 is another flow chart depicting a portion of an exemplary embodiment of an authentication process consistent with certain embodiments of the present invention.

One embodiment of this process is depicted in greater detail in FIG. 5 taken in conjunction with FIG. 6, again starting at 502. As previously described, the server 1 and client 2 are placed in a registration mode (using a predetermined operational sequence) at 503. The server 1 then generates a random ID number at 504. In general, this number can be N digits long, with N=4 being a suggested number of digits. A counter (M) is initialized to 1 at 505 and the server 1 displays the first ($M^{th}$) digit of the random ID number as a sequence of flashes of LED or other light 606 at 506 (e.g., the "3" of ID number 3915 is represented first as three flashes). At 507, the user begins entry of the ID number using the data button 602 by pressing the data button the number of times specified by the first digit of the ID number. When the first digit is entered, the enter button 603 is pressed once. Control then passes back to 506 where if the last digit has not yet been entered, the counter is incremented and the next digit is represented by a number of flashes of LED 606. Control then returns to 507 where the next digit is entered in the same manner. Once all digits have been entered at 508, the remainder of the authentication and key exchange process as previously described is carried out at 510 (i.e., the process that starts at 401).

In variations of the above, the user can be required to actuate the data button 602 simultaneously with the LED 606 being lighted, or all of the LED 606 flashes that represent a single digit can be done, followed by a time period for actuation of the data button.

In another variant, the enter button 603 can be eliminated altogether by various mechanisms. For example, pressing and holding the data button 602 for greater than a specified period of time (e.g., hold for three seconds) can be used as an equivalent of the enter button. In other embodiments, the server 1 can provide a time window for each digit to be entered. The expiration of the time window can be used as a point of determination that the digit has been entered or not.

In still another embodiment, an LED lighting period on may be utilized rather than flashes. For "0", the LED turns on 1 second and the user pushes the button for 1 sec. For "3", the LED is on for 4 seconds. The client 2 resets the internal counter and starts counting when the button is pressed. If it is pressed equal to or more than 3 seconds and less than 4 seconds, it determines "3" is entered.

Thus, a network client device consistent with certain embodiments has a network interface for communication over a communication network. A switch is provided; wherein a random secret number can be entered at the client device by sequentially entering each digit of the random secret number by actuation of the switch a number of times equivalent to each digit of the random secret number. A hashing device can be used to hash the random secret number at the client device using a hashing algorithm to produce a secret key. An encryption/decryption engine uses the secret key in a decryption process for the exchange of an encryption/decryption key with a server device.

A network server device consistent with certain embodiments has a network interface for communication over a communication network. A random number generator that a multi-digit random secret number. A display displays the random secret number. A hashing mechanism is used for hashing the random secret number using a hashing algorithm to produce a secret key. An encryption/decryption engine uses the secret key to encrypt an encryption/decryption key that is exchanged between a client device and the server device.

In certain embodiments, the display is a multi-digit display and wherein the random secret number is displayed in its entirety by the display. In other embodiments, the random secret number is displayed by the server display a single digit at a time. In other embodiments, the server display is a flashing display that represents each digit of the random secret number by a number of flashes.

Although not shown explicitly in the drawings, it will be understood that the authentication and key exchange process will end with a failure to authenticate in the event the ID number is entered incorrectly. Those skilled in the art will appreciate that various steps can be taken at this point to terminate the authentication and/or restart any subsequent authentication process.

Certain embodiments consistent with the present invention enjoy several advantages: Secure device authentication. No raw data is transmitted over the network without encryption. It prevents a MITM attack. Easy to use. The user only needs to input 4-digit number by pushing the buttons. No long number is required to enter. No special, expensive hardware or interface is necessary. No expensive user interface (keyboard, a large display, etc.) required. Only small software change required. No big impact to the cost. While these and other advantages may be achieved using embodiments consistent with the present invention, failure to meet any of these advantages does not imply that an embodiment falls outside the realm of other embodiments consistent with the present invention.

While the present discussion has used the terms "server" and "client" in exemplary embodiments, those skilled in the art should understand that for purposes of the present authentication processes, a client device can operate in the manner described above as a that of a server, and a server device can operate in the manner described above as a client. Hence, the terms "client" and "server" are not to be construed strictly in connection with limiting the claims. The terms should merely be considered labels for each device in connection with its respective operation in the current authentication processes.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method for authenticating a client device into a network, comprising:
   at a server device, generating a multi-digit random secret number;
   displaying the random secret number on a server display coupled to the server device;
   while the client device is positioned in close enough physical proximity to the server device to permit observation of the displayed random secret number, receiving, at the client device, a signal representing sequential entry of each digit of the random secret number by actuation of a switch coupled to the client device a number of times equivalent to each digit of the random secret number; and
   upon correct entry of the random secret number at the client device, completing an authentication and key exchange process using the random secret number in an encryption and decryption process carried out at the server device and the client device.

2. The method according to claim 1, further comprising:
   hashing the random secret number at the server device using a hashing algorithm to produce a secret key;
   hashing the random secret number at the client device using the hashing algorithm to produce the secret key; and
   using the secret key to encrypt and decrypt an encryption/decryption key that is exchanged between the client device and the server device.

3. The method according to claim 1, wherein the display comprises a multi-digit display and wherein the random secret number is displayed in its entirety by the server display.

4. The method according to claim 1, wherein the random secret number is displayed by the server display a single digit at a time.

5. The method according to claim 1, wherein the server display comprises a flashing display that represents each digit of the random secret number by a number of flashes.

6. The method according to claim 1, further comprising, at the client device, actuating an enter switch after entry of each digit in order to signify the end of entry of the digit.

7. The method according to claim 1, wherein the network comprises a power line communication (PLC) network.

8. A method for authenticating a client device into a network, comprising:
   at a server device, generating a multi-digit random secret number;
   displaying the random secret number on a server display coupled to the server device;
   while the client device is positioned in close enough physical proximity to the server device to permit observation of the displayed random secret number, receiving, at the client device, a signal representing sequential entry of each digit of the random secret number by actuation of a switch coupled to the client device a number of times equivalent to each digit of the random secret number;
   hashing the random secret number at the server device using a hashing algorithm to produce a secret key;
   hashing the random secret number at the client device using the hashing algorithm to produce the secret key; and
   using the secret key to encrypt and decrypt an encryption/decryption key that is exchanged between the client device and the server device.

9. The method according to claim 8, wherein the display comprises a multi-digit display and wherein the random secret number is displayed in its entirety by the display.

10. The method according to claim 8, wherein the random secret number is displayed by the display a single digit at a time.

11. The method according to claim 10, wherein the server display comprises a flashing display that represents each digit of the random secret number by a number of flashes.

12. The method according to claim 8, further comprising, at the client device, actuating an enter switch after entry of each digit in order to signify the end of entry of the digit.

13. The method according to claim 8, wherein the network comprises a power line communication (PLC) network.

14. A method for authenticating a client device into a power line communication (PLC) network, comprising:
   at a server device, generating a multi-digit random secret number;

displaying the random secret number on a server display coupled to the server device;

while the client device is positioned in close enough physical proximity to the server device to permit observation of the displayed random secret number, receiving, at the client device, a signal representing sequential entry of each digit of the random secret number by actuation of a switch coupled to the client device a number of times equivalent to each digit of the random secret number;

at the client device, actuating an enter switch after entry of each digit in order to signify the end of entry of the digit;

hashing the random secret number at the server device using a hashing algorithm to produce a secret key;

hashing the random secret number at the client device using the hashing algorithm to produce the secret key; and using the secret key to encrypt and decrypt an encryption/decryption key that is exchanged between the client device and the server device.

15. The method according to claim 14, wherein the display comprises a multi-digit display and wherein the random secret number is displayed in its entirety by the display.

16. The method according to claim 14, wherein the random secret number is displayed by the display a single digit at a time.

17. The method according to claim 16, wherein the display comprises a flashing display that represents each digit of the random secret number by a number of flashes.

18. A network client device, comprising:
a network interface for communication over a communication network;
a switch; wherein a random secret number can be entered at the client device by sequentially entering each digit of the random secret number by actuation of the switch a number of times equivalent to each digit of the random secret number;
means for hashing the random secret number at the client device using the hashing algorithm to produce a secret key; and
an encryption/decryption engine that uses the secret key in a decryption process for the exchange of an encryption/decryption key with a server device.

19. The network client device according to claim 18, further comprising, an enter switch, wherein the enter switch can be actuated after entry of each digit in order to signify the end of entry of the digit.

20. The network client device according to claim 18, wherein the network interface comprises a power line communication (PLC) network interface.

21. The network client device according to claim 18, wherein the encryption/decryption engine comprises a programmed processor.

22. A network server device, comprising:
a network interface for communication over a communication network;
a random number generator that generates a multi-digit random secret number;
a display that displays the random secret number;
means for hashing the random secret number using a hashing algorithm to produce a secret key; and
an encryption/decryption engine that uses the secret key to encrypt an encryption/decryption key that is exchanged between a client device and the server device.

23. The network server device according to claim 22, wherein the display comprises a multi-digit display and wherein the random secret number is displayed in its entirety by the display.

24. The network server device according to claim 22, wherein the random secret number is displayed by the server display a single digit at a time.

25. The network server device according to claim 24, wherein the server display comprises a flashing display that represents each digit of the random secret number by a number of flashes.

26. The network server device according to claim 22, wherein the network interface comprises a power line communication (PLC) network interface.

27. The network server device according to claim 22, wherein the encryption/decryption engine comprises a programmed processor.

28. A communication network, comprising:
a server device having:
a server network interface for communication over a communication medium;
a random number generator that generates a multi-digit random secret number;
a display that displays the random secret number;
server hashing means for hashing the random secret number using a hashing algorithm to produce a secret key; and
a server encryption/decryption engine that uses the secret key to exchange an encryption/decryption key between the server device and a client device;
the client device having:
a client network interface for communication over the communication network;
a switch; wherein a random secret number can be entered at the client device by sequentially entering each digit of the random secret number by actuation of the switch a number of times equivalent to each digit of the random secret number;
client hashing means for hashing the random secret number at the client device using the hashing algorithm to produce a secret key; and
a client encryption/decryption engine that uses the secret key to exchange of the encryption/decryption key with the server device.

29. The communication network according to claim 28, wherein the client device further comprises an enter switch, wherein the enter switch can be actuated after entry of each digit in order to signify the end of entry of the digit.

30. The communication network according to claim 28, wherein the client and server network interfaces comprise power line communication (PLC) network interfaces.

31. The communication network according to claim 28, wherein at least one of the client and server encryption/decryption engines comprise a programmed processor.

32. The communication network according to claim 28, wherein the display comprises a multi-digit display and wherein the random secret number is displayed in its entirety by the display.

33. The communication network according to claim 28, wherein the random secret number is displayed by the display a single digit at a time.

34. The communication network according to claim 28, wherein the display comprises a flashing display that represents each digit of the random secret number by a number of flashes.

* * * * *